United States Patent
Ashjaee et al.

(10) Patent No.: US 9,168,946 B2
(45) Date of Patent: Oct. 27, 2015

(54) METHOD FOR GENERATING OFFSET PATHS FOR GROUND VEHICLES

(75) Inventors: Javad Ashjaee, Saratoga, CA (US); Alexander V. Pesterev, Moscow (RU); Lev B. Rapoport, Moscow (RU)

(73) Assignee: JAVAD GNSS, INC., San Jose, CA (US)

( * ) Notice: Subject to any disclaimer, the term of this patent is extended or adjusted under 35 U.S.C. 154(b) by 576 days.

(21) Appl. No.: 12/728,046

(22) Filed: Mar. 19, 2010

(65) Prior Publication Data
US 2011/0231057 A1     Sep. 22, 2011

(51) Int. Cl.
| G05D 1/02 | (2006.01) |
| B62D 1/28 | (2006.01) |
| A01B 69/04 | (2006.01) |
| B62D 1/02 | (2006.01) |

(52) U.S. Cl.
CPC ............... *B62D 1/28* (2013.01); *A01B 69/008* (2013.01); *B62D 1/02* (2013.01); *G05D 1/02* (2013.01)

(58) Field of Classification Search
CPC .. A01B 69/008; A01B 69/001; A01B 69/007; A01B 69/00; B62D 1/00; B62D 1/02; B62D 1/28; B60T 2210/24; G05D 1/02; G05D 1/021; G05D 1/0219
USPC .................................................. 701/41, 50
See application file for complete search history.

(56) References Cited

U.S. PATENT DOCUMENTS

| 4,727,492 A | * | 2/1988 | Reeve et al. | 701/25 |
| 5,648,901 A | * | 7/1997 | Gudat et al. | 701/23 |
| 6,421,601 B2 | * | 7/2002 | Sekine | 701/442 |
| 7,084,882 B1 | | 8/2006 | Dorum et al. | |
| 7,209,810 B2 | * | 4/2007 | Meyer et al. | 701/19 |
| 7,277,792 B2 | * | 10/2007 | Overschie | 701/467 |
| 7,363,154 B2 | * | 4/2008 | Lindores | 701/26 |
| 7,689,354 B2 | * | 3/2010 | Heiniger et al. | 701/412 |
| 8,140,257 B2 | * | 3/2012 | Villaume et al. | 701/467 |
| 8,195,363 B2 | * | 6/2012 | Isaji et al. | 701/41 |
| 8,229,645 B2 | * | 7/2012 | Lee | 701/96 |
| 8,583,366 B2 | * | 11/2013 | Iida | 701/450 |

(Continued)

OTHER PUBLICATIONS

Non Final Office Action received for U.S. Appl. No. 12/070,333, mailed on Sep. 6, 2011, 7 pages.

(Continued)

*Primary Examiner* — John Q Nguyen
*Assistant Examiner* — Michael Whalen
(74) *Attorney, Agent, or Firm* — Morrison & Foerster LLP

(57) ABSTRACT

A computer-implemented method for generating at least one segment of an offset path for a vehicle based on at least one segment of a base path is provided. The at least one segment of the base path is represented by a stored set of data points. The computer-implemented method includes comparing the at least one segment of the base path to a curvature constraint to determine if the at least one segment of the base path violates the curvature constraint. The curvature constraint is based on a characteristic of the vehicle and a desired offset distance from the at least one segment of the base path. The characteristic reflects the vehicle's ability to traverse at least one segment of a path. The method further includes modifying the at least one segment of the base path to satisfy the curvature constraint, if the at least one segment of the base path violates the curvature constraint. At least one segment of an offset path for the vehicle to follow is generated based upon the desired offset distance from the modified at least one segment of the base path.

29 Claims, 7 Drawing Sheets

(56) References Cited

U.S. PATENT DOCUMENTS

| | | | | |
|---|---|---|---|---|
| 2001/0037173 | A1* | 11/2001 | Sekine | 701/200 |
| 2005/0171684 | A1* | 8/2005 | Turner | 701/200 |
| 2006/0224318 | A1 | 10/2006 | Wilson et al. | |
| 2007/0083299 | A1* | 4/2007 | Lindores | 701/2 |
| 2007/0085850 | A1 | 4/2007 | Hong et al. | |
| 2008/0103694 | A1* | 5/2008 | Dix et al. | 701/213 |
| 2008/0255728 | A1* | 10/2008 | Ottenhues et al. | 701/41 |
| 2009/0150068 | A1* | 6/2009 | Villaume et al. | 701/206 |
| 2010/0082203 | A1* | 4/2010 | Isaji et al. | 701/41 |
| 2010/0185366 | A1* | 7/2010 | Heiniger et al. | 701/50 |
| 2011/0218724 | A1* | 9/2011 | Iida | 701/70 |
| 2012/0239287 | A1* | 9/2012 | Pieper et al. | 701/400 |
| 2012/0296529 | A1* | 11/2012 | Peake et al. | 701/50 |
| 2013/0289833 | A1* | 10/2013 | Peake et al. | 701/50 |

OTHER PUBLICATIONS

Non Final Office Action received for U.S. Appl. No 12/070,333, mailed on Feb. 13, 2012, 10 pages.

Final Office Action received for U.S. Appl. No. 12/070,333, mailed on Jun. 20, 2012, 10 pages.

Eck et al., "Local Energy Fairing of B-Spline Curves", Computing Supplementum 10, Geometric Modeling, 1995, pp. 129-147.

Farin, Gerald, "Degree Reduction Fairing of Cubic B-Spline Curves", Geometry Processing for Design and Manufacturing, SIAM, 1992, pp. 87-99.

Farin et al., "Fairing Cubic B-Spline Curves", Computer Aided Geometric Design, vol. 4, 1987, pp. 91-103.

Kallay, Michael, "Constrained Optimization in Surface Design", Modeling in Computer Graphics, B. Falcidien and T.L. Kunii, Eds., Berlin: Springer, 1993, pp. 85-93.

Kjellander, Johan A. P., "Smoothing of Cubic Parametric Splines", Computer Aided Design, vol. 15, No. 3, 1983, pp. 175-179.

Liu et al., "Adaptive Fairing of Digitized Point Data with Discrete Curvature", Computer-Aided Design, vol. 34, No. 1, 2002, pp. 309-320.

Pesterev et al., "Global Energy Fairing of B-Spline Curves in Path Planning Problems", In Proceedings of the ASME 2007 International Design Engineering Technical Conferences & Computers and Information in Engineering Conference, Las Vegas, Nevada, USA, Sep. 4-7, 2007, pp. 1-7.

Pigounakis et al., "Convexity Preserving Fairing", Computer-Aided Design, vol. 28, No. 12, 1996, pp. 981-994.

Sapidis et al., "Automatic Fairing Algorithm for B-Spline Curves", Computer-Aided Design, vol. 22, No. 2, 1990, pp. 121-129.

Notice of Allowance for U.S. Appl. No. 12/070,333, mailed on Aug. 2, 2013, 8 pages.

* cited by examiner

METHOD FOR GENERATING OFFSET PATHS FOR GROUND VEHICLES

BACKGROUND OF THE INVENTION

There are many situations, such as in agricultural applications, where controlling the path of a vehicle is useful. A vehicle may move along a curvilinear trajectory of a base path. After completing the curvilinear trajectory, the vehicle is required to repeat similar trajectory (or, perhaps, several trajectories) at some offset distance from the curved base path. For example, this situation may arise when a tractor plows a plot of land with curvilinear boundaries.

Traditionally, an offset path for a vehicle is generated by translating each point of the base path at a distance d in a direction perpendicular to the base path. However, an offset path generated in this manner does not take into account the vehicle tolerances set by the vehicle's physical characteristics. In other words, a vehicle may not be capable of following the offset path generated for the vehicle because of the physical constraints of the vehicle. An example of such a constraint is a wheel turning radius.

Accordingly, it would be desirable to be able to automatically and reliably create offset paths at any given distance from the original curve that a given vehicle can traverse and which could be repeated in an automated mode.

BRIEF SUMMARY OF THE INVENTION

In one embodiment, a computer-implemented method for generating at least one segment of an offset path for a vehicle based on at least one segment of a base path is provided. The at least one segment of the base path is represented by a stored set of data points. The computer-implemented method includes comparing the at least one segment of the base path to a curvature constraint to determine if the at least one segment of the base path violates the curvature constraint. The curvature constraint is based on a characteristic of the vehicle and a desired offset distance from the at least one segment of the base path. The characteristic reflects the vehicle's ability to traverse at least one segment of a path. The method further includes modifying the at least one segment of the base path to satisfy the curvature constraint, if the at least one segment of the base path violates the curvature constraint. At least one segment of an offset path for the vehicle to follow is generated based upon the desired offset distance from the modified at least one segment of the base path.

In another embodiment, a computer-readable storage medium encoded with executable instructions for generating at least one segment of an offset path for a vehicle based on at least one segment of a base path is provided. The at least one segment of the base path is stored as a set of data points. The instructions include instructions for comparing the at least one segment of the base path to a curvature constraint to determine if the at least one segment of the base path violates the curvature constraint. The curvature constraint is based on a characteristic of the vehicle and a desired offset distance from the at least one segment of the base path. The characteristic reflects the vehicle's ability to traverse at least one segment of a path. The instructions further include instructions for modifying the at least one segment of the base path to satisfy the curvature constraint, if the at least one segment of the base path violates the curvature constraint, and generating at least one segment of an offset path for the vehicle to follow based upon the desired offset distance from the modified at least one segment of the base path.

In another embodiment, a system for generating an offset path for a vehicle based on a base path is provided. The at least one segment of the base path is stored as a set of data points. The system includes a memory for storing instructions and a processor for executing the instructions. The instructions include instructions for comparing the at least one segment of the base path to a curvature constraint to determine if the at least one segment of the base path violates the curvature constraint. The curvature constraint is based on a characteristic of the vehicle and a desired offset distance from the at least one segment of the base path. The characteristic reflects the vehicle's ability to traverse at least one segment of a path. The instructions further include instructions for modifying the at least one segment of the base path to satisfy the curvature constraint, if the at least one segment of the base path violates the curvature constraint, and generating at least one segment of an offset path for the vehicle to follow, based upon the desired offset distance from the modified at least one segment of the base path.

Other features and aspects of the invention will become apparent from the following detailed description, taken in conjunction with the accompanying drawings which illustrate, by way of example, the features in accordance with embodiments of the invention. The summary is not intended to limit the scope of the invention.

In the following description, reference is made to the accompanying drawings which form a part thereof, and which illustrate several embodiments of the present invention. It is understood that other embodiments may be utilized and structural and operational changes may be made without departing from the scope of the present invention. The use of the same reference symbols in different drawings indicates similar or identical items.

DETAILED DESCRIPTION OF THE INVENTION

The following description is presented to enable any person of ordinary skill in the art to make and use the invention. Descriptions of specific materials, techniques, and applications are provided only as examples. Various modifications to the examples described herein will be readily apparent to those of ordinary skill in the art, and the general principles defined herein may be applied to other examples and applications without departing from the spirit and scope of the invention. Thus, the present invention is not intended to be limited to the examples described and shown.

Embodiments of the invention generally relate to a method for generating segments of offset paths based on segments of base paths. This is useful in the field of automated steering control for a ground vehicle, for example. A ground vehicle in an automated mode may traverse the offset path generated by embodiments of the invention to travel through an area. In embodiments of the invention, the ground vehicle may traverse generated segments of offset paths in order to efficiently travel around, and throughout, an area. For example, an agricultural vehicle may travel in a helical path, determined by segments of offset paths generated by embodiments of the invention, in order to travel through as much area of a field as possible.

Figure 1:
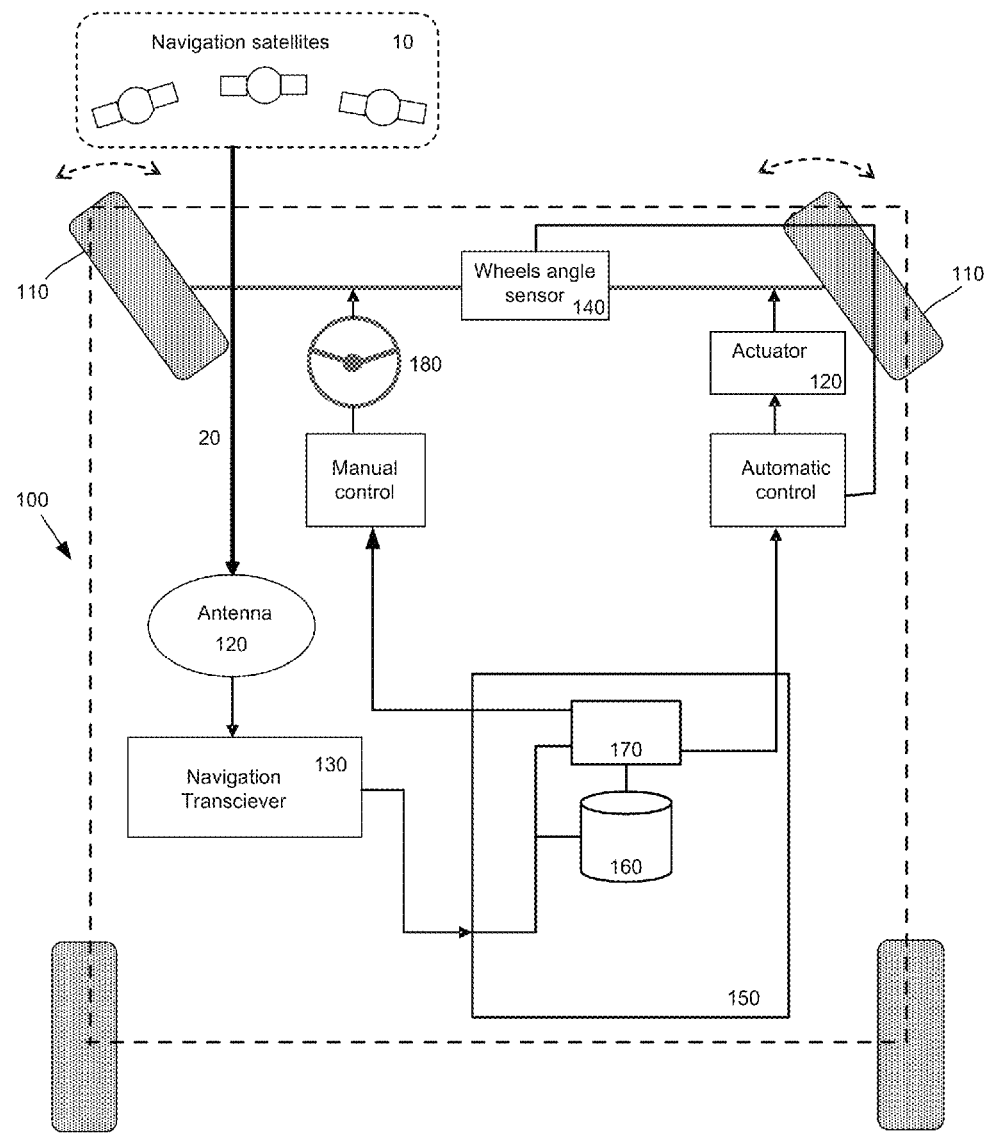
FIG. 1 illustrates a vehicle according to embodiments of the invention.

A vehicle according to embodiments of the invention is illustrated in FIG. 1. Navigation signals 20 provided by the position determining system 10 are received/transmitted by an antenna 120 included on the vehicle 100. The antenna 120 and/or a navigation transceiver 130 may be mounted at a specific location on the vehicle 100, such as the roof of the vehicle 100, to maximize reception potential. The navigation transceiver 130 may be a combined GPS and GLONASS navigation receiver, for example. The GNSS-measured position and velocity (from the navigation signals 20) are directed from the navigation transceiver 130 to a system according to embodiments of the invention 150. System 150 includes a processor 160 and a memory 170. Vehicle paths may be stored in the memory 170 as sets of data points from the GPS and GLONASS navigation receiver.

The system 150 is configured to generate segments of offset paths according to embodiments of the invention. The system 150 may perform additional computations or filtering.

Offset paths, curvature constraints, and other control signals may be calculated by the system 150 using information about vehicle position, curvature constraints, velocity, body orientation, and steered wheels rotation angle provided by the GPS signals, and a wheels angle sensor 140, for example. The steered wheels rotation angle is measured by the sensor 140.

In alternative embodiments, system 150 can be implemented using a general or special purpose processor such as, for example, a microprocessor, microcontroller, controller, ASIC, or other processing subsystems, modules, components, logic units, or the like, or as a general or special purpose computer or server. System 150 may be configured collectively as a single processor, as separate processors, or otherwise be implemented in a computing environment, depending on processing requirements, operating environment, and cost constraints. System 150 can include control logic such as, for example, software instructions, computer program code, or the like, to carry out calculations, filtering, and other processing functions. It is also contemplated that the memory 170 may be included within system 150. In alternative embodiments, the functionalities of system 150, processor 160, and/or memory 170 may be provided remote from the vehicle 100, possibly in a client-server environment.

Front steered wheels 110 are controlled either manually by a steering wheel 180 or automatically by an actuator 120. The actuator 120 can be an electronically controlled hydraulic steering mechanism, which changes the angle of the front wheels 110 based on control signals received from the system 150. The control signals may be received through a data bus like CAN or RS-485 or other communication data buses used in the machine control industry.

It is contemplated that additional actuators, sensors, processors, memories, and other components may be included in the vehicle 100 to facilitate communication with the position determining system 10, generate segments of offset paths, calculate curvature constraints, perform data processing, sense and control mechanical parts such as the steering wheel and wheels, etc. as required for selective automatic and manual control of the vehicle 100.

In other embodiments, the segment of the base path may be defined by a set of points which are stored in memory of a computer. In one example, this set of points can be GNSS-measured positions of a vehicle collected as the vehicle drives along a path. Alternatively, the set of points forming the segment of the base path may represent discrete coordinates of a map. In embodiments of the invention, this segment of the path is stored in a computer as a set of n equidistant points $r_1, r_2, \ldots, r_n$. Further, these data points may be interpolated by a smooth curve, such that the base path is described by a parametric vector function $r(t)=(X(t),Y(t))^T$, where t is a parameter and $X(t)$ and $Y(t)$ are three times differentiable functions. In embodiments of the invention, the base path is approximated by a cubic B-spline curve. The curvature constraint imposed on a path traversed by the vehicle may be due to limited turning angle of the front wheels of the vehicle, for example. This is described as follows:

$$|k(t)| \leq \overline{k}, \quad (1)$$

where $$k(t) = \frac{|\dot{r}(t) \times \ddot{r}(t)|}{|\dot{r}(t)|^3}, \quad (2)$$

is the curvature of the curve $r(t)$, $\dot{r}_i$ and are derivatives of function $r(t)$ with respect to parameter t, and $\overline{k}$ is the vehicle constraint, the maximum allowed curvature specific to a given vehicle. The vehicle constraint may depend on the maximum turning angle of the vehicle's front wheels and the wheelbase distance, for example.

According to embodiments of the invention, there is no strict requirement that the distances between any two successive data points are the same, as done previously. If the distances between vehicle positions are different, a set of equidistant data points can be generated. These points may be generated by first, creating a simple approximate curve (e.g., a piecewise linear) and, second, selecting new, equidistant, data points on this curve. A method for selecting the equidistant points is described in, for example, U.S. application Ser. No. 12/070,333, entitled "Path Approximation for Planar Motion of a Ground Vehicle," which is incorporated herein by reference in its entirety for all purposes.

The concept of offset paths is similar to the concept of parallel lines. An offset curve is comprised of points at the same distance from the original curve. An offset curve is at a desired distance from the base path. A parallel curved path is defined by the equation:

$$\tilde{r}(t) = r(t) + dN(t), \quad (3)$$

where $N(t)$ is a unit normal vector to the base path. The distance d may be both positive and negative. The positive distance corresponds to the offset in the direction of the normal to the curve, and the negative distance, in the opposite direction.

However, for offset paths for ground vehicles, such a definition of parallel curved paths cannot practically be employed. In other words, a parallel curved path generated in accordance with equation (3) may not always meet the curvature constraints of the ground vehicle. As such, the ground vehicle may not be capable of traversing the parallel curved path generated according to equation (3).

To further demonstrate this problem, the curvature of the offset curve is known to be:

$$\tilde{k}(t) = \frac{k(t)}{|1 + dk(t)|}, \quad (4)$$

As can be seen, its magnitude may exceed the bound $\overline{k}$ even if the base path can be traversed by the vehicle.

Hence, in this case, the parallel curved path is not a path that can be traversed by the vehicle, since the vehicle cannot follow it without deviations because of limits imposed on the vehicle due to physical and performance limits. In embodiments of the invention, a vehicle constraint is based upon in part these physical and performance limits. Therefore, a parallel curved path generated by equation (3), which is a distance d from the base path, may not be able to be utilized by the ground vehicle to determine its trajectory if the vehicle constraint $\overline{k}$ of the vehicle, as in equation (1), is not a factor in generating the new path for the vehicle.

To further demonstrate the problem, in one situation, if the curvature of a parallel curved path (3) does not violate the curvature constraint (1), then the curved parallel path (3) can be traversed by the ground vehicle.

However, in another example, the curvature of a curved parallel path (3), calculated by (4), may violate the curvature constraint (1). Thus, a ground vehicle is not able to traverse the curved parallel path in this situation.

Thus, it is desirable to generate segments of an offset path based on both a desired distance d from corresponding segments of the base path and a characteristic of the vehicle, which is based on physical and performance limits of the vehicle. The curvature constraint is based on a characteristic of the vehicle and a desired offset distance. The characteristic reflects the vehicle's ability to traverse a segment of a path. In generating such a path, adjustment of d may be necessary to satisfy the curvature constraint. Further, the whole offset path may consist of several segments, in some examples. In this way, the offset path that is generated will be a close approximation of a parallel curved path, but can be traversed by the vehicle.

Figure 2:
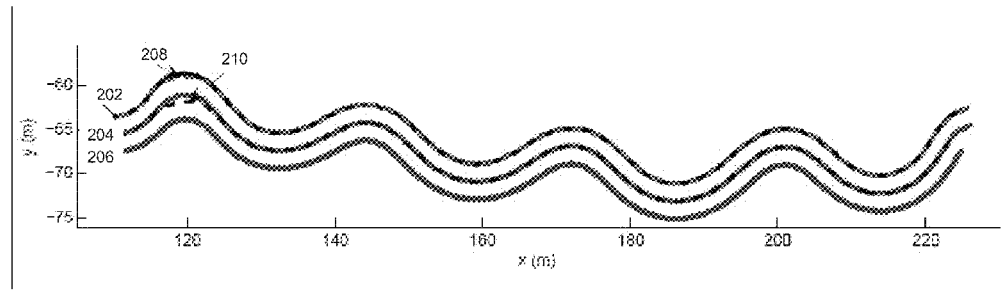
FIG. 2 illustrates offset paths generated according to embodiments of the invention.

FIG. 2 illustrates offset paths generated by embodiments of the invention. The base path 202 is illustrated. The base path 202 may be generated by a set of GNSS-measured positions. Curves 204 and 206 are generated offset paths. The offset path 204 is generated, as long as each path meets a curvature constraint, at a distance of 2 m from one another. In this example, the generated offset paths are generated at a distance of 2 m apart, except for segment 210. The desired distance between each generated curved path 204 is greater than 2 m from the base path 202 at segment 210 in order to meet the curvature constraint based on a characteristic of the vehicle.

A modification to the original data point set representing the segment of the base path is performed in order to generate segments of offset paths that do not violate the curvature constraint (1) according to embodiments of the invention. The modification of the data point set is initiated when it is determined that the parallel path does not meet the curvature constraint. In other words, the curvature constraint will be violated if a predicted curved parallel path (3) cannot be traversed by the ground vehicle due to physical or performance limits of the vehicle. To determine whether the curvature of the parallel path exceeds $\overline{k}$, equation (4) is substituted into (1). Then, a predicted parallel curved path (3) is determined to meet the constraint if one of the following conditions holds:

$$k \leq k_{cr} \text{ for } d > 0 \quad (5)$$

or $$k \geq -k_{cr} \text{ if } d < 0, \quad (6)$$

where $$k_{cr} = \frac{\overline{k}}{1 + \overline{k}|d|}. \quad (7)$$

According to embodiments of the invention, at least one segment of a base path may be examined to check whether it meets the curvature constraint (5) (or (6)). The curvature constraint is based on a vehicle constraint and a desired offset distance. If the at least one segment of the base path is determined to violate the curvature constraint, then the at least one segment of the base path is modified. The at least one segment of the base path is modified such that the corresponding segment of the offset path constructed from the modified segment satisfies the vehicle constraint of (1), according to embodiments of the invention.

Thus, the generation of the segment of the offset path for the vehicle to follow reduces to finding the above-mentioned modification of the segment of the base path, which will be disclosed below.

The modification procedure resulting in the creation of a nominal set of points $\hat{r}_1, \hat{r}_2, \ldots m\,\hat{r}_n$, which form a modified segment of the base path, from the original data set $r_1, r_2, \ldots, r_n$, which form the segment of the base path, is disclosed below.

First, the curvature of the segment of the base path at the points $r_1, r_2, \ldots, r_n$, is calculated as $$k_i = \frac{|\dot{r}_i \times \ddot{r}_i|}{|\dot{r}_i|^3}, \quad (8)$$

where $\dot{r}_i$ and $\ddot{r}_i$ are derivatives of function r(t) used for the interpolation of the data set $r_1, r_2, \ldots, r_n$ with respect to parameter t.

In embodiments of this invention, cubic B-spline interpolation is utilized to calculate the curvature at these points without generation of the curve itself by using the following formulas for the derivatives:

$$\dot{r}_i = \frac{1}{2}(r_{i+1} - r_{i-1}), \ddot{r}_i = r_{i+1} - 2r_i + r_{i-1}. \quad (9)$$

Then, it is checked whether the calculated values of curvature (8) satisfy inequality (5) (or (6), depending on the sign of the offset distance d). The data points where the inequality is not satisfied are marked and grouped into subsets of violation points to be further modified. The curvature of the base path at these violation points does not satisfy the curvature constraint (5) (or (6)). Thus, the offset path generated from the base path will violate constraint (1) at the points corresponding to these violation points.

Modification of the segment of the base path, according to embodiments of the invention, can be understood from the description in this document. The modified base path is then used to generate an offset path. In some examples, the offset path may be parallel to the base path.

A graphical representation based on the curvature constraint (7) is used to determine the modifications of the segment of the base path, according to embodiments of the invention. For example, a graphical representation based on a curvature constraint is a disk of radius $R_{cr}=1/k_{cr}$ lying in the plane of the curve of the base path. The graphical representation is repositioned along the segment of the base path where the segment of the offset path is desired to be generated.

Thus, in using a disk representation, the radius of the disk depends on the minimum turning radius, for example, of the vehicle for which the segments are being generated and on the offset distance d. Consider the case of d>0 (the case of d<0 is analyzed similarly), if condition (5) holds for any point of the path, then the disk always touches the curve at only one point and all other points of the curve lie outside the disk. On the contrary, if (5) is violated at some point of the curve and the disk is forced to touch the curve at this point, then some segment of the curve containing this point lies inside the disk and needs to be modified in order to satisfy the curvature constraint inequality (5) to generate a segment of the offset path corresponding to the segment of the base path. This observation underlies the modification procedure discussed. Modification of an entire path may consist of modifications of each segment that violates the curvature constraint. In other examples, a segment of a path may be the entire path.

Consider a segment of violation points, which includes data points of the curve of the base path that do not meet condition (5). Modification of this segment of the curve of the base path, according to embodiments of the invention, is illustrated by the examples shown in FIGS. 3-7. FIGS. 3-7 illustrate an example of a graphical representation based on the curvature constraint, a disk O, having a radius $R_{cr}$. In other words, in this example according to embodiments of the invention, the imaginary disk O is a graphical representation of the curvature constraint. Data points of the at least one segment of the base path 302 that do not meet condition (5) are violation points. Disk O touches the curve at the first violation point $r_j$ of the segment. To this end, the center of disk O is placed along the normal to the at least one segment of the base path 302 at the point $r_j$ 318, such that the distance of the center of disk O from $r_j$ be equal to the radius of the disk.

Figure 3:
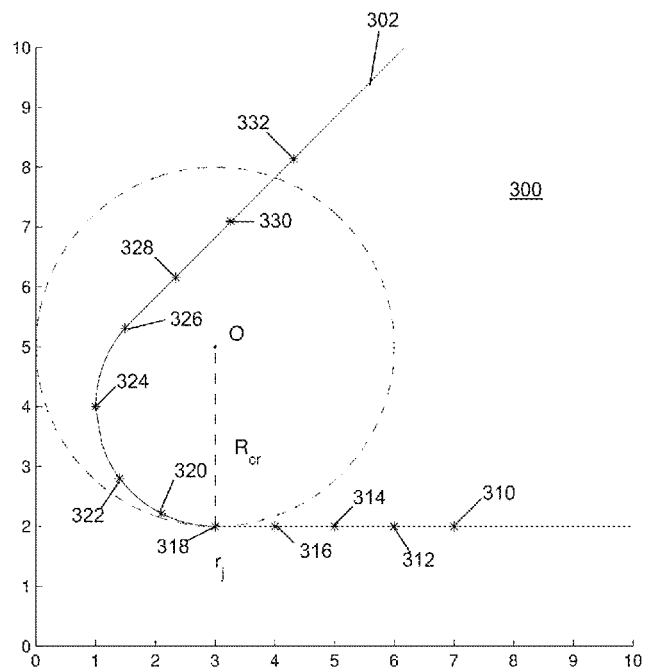
FIG. 3 illustrates a representation of a curvature constraint and a curved path that violates the curvature constraint according to embodiments of the invention.

As illustrated in FIG. 3, an exemplary segment of the base path 302 is shown with disk O. The data points 310, 312, 314, 316, 318, 320, 322, 324, 326, 328, 330, and 332 are all in the set of data points making up the segment of the base path 302. Disk O is positioned such that the center of disk O is along the normal to the tangent vector at the first violation point, point 318.

In one embodiment of this invention, where cubic B-spline interpolation is used, the normals to the segment of the base path are calculated as unit vectors perpendicular to the tangent vectors to the segment of the base path at the data points, where the tangent vector at a point $r_j$, 318 is calculated by the first equation (9).

Since condition (5) is violated at point $r_j$, this disk contains some other points from the data set, particularly, points 320, 322, 324, 326, 328, and 330 lie within the disk, it can be determined that the segment of the base path 302 needs to be modified so that a corresponding segment of the offset path (3) can be generated that satisfies the vehicle constraint (1).

Figure 4:
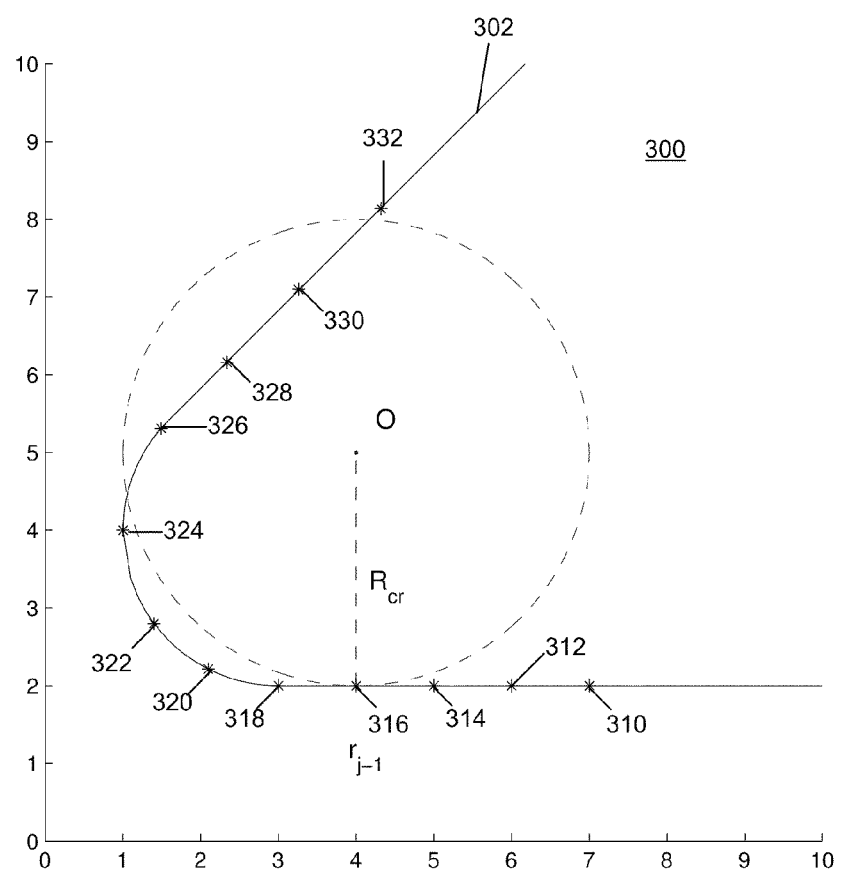
FIG. 4 illustrates repositioning a representation of a curvature constraint to determine a modification to the base path according to embodiments of the invention.

With reference to the example shown in FIG. 4, disk O is repositioned to the previous point of the segment of the base path 302, $r_{j-1}$ 316, such that fewer points of the segment of the base path lie within disk O compared to when disk O was positioned at the first point $r_j$, 318.

In the first step, disk O is repositioned along the curve such that it touches the curve at the point $r_{j-1}$ 316. The center of disk O is positioned on the normal to a tangent at point $r_{j-1}$ 316. Points 326, 328, and 330 of segment of the base path 302 are still within disk O. Disk O is repositioned until the situation is reached where disk O contains no points of the segment of the base path 302, and disk O touches the segment of the base path 302 at only two points. The segment of the base path may be modified based on disk O in this position.

Figure 5:
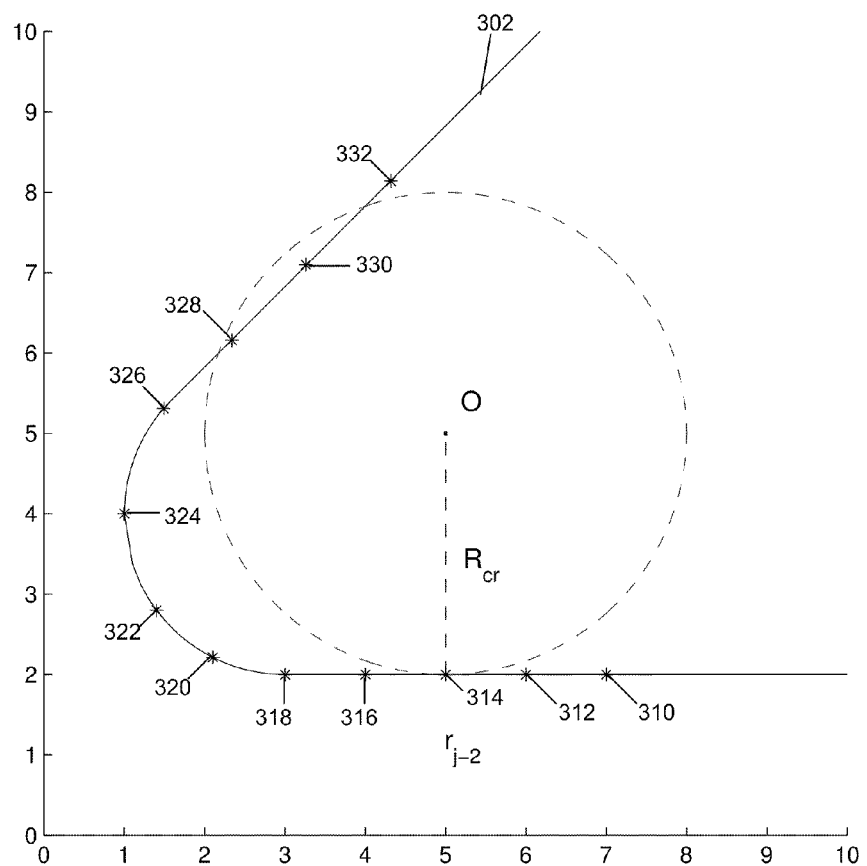
FIG. 5 illustrates another repositioning a representation of a curvature constraint to determine a modification to the base path according to embodiments of the invention.

Continuing with the example, FIG. 5 illustrates another repositioning of disk O to the location where it touches the segment of the base path 302 at point $r_{j-2}$ 314. Still, points 328 and 330 are within disk O.

Figure 6:
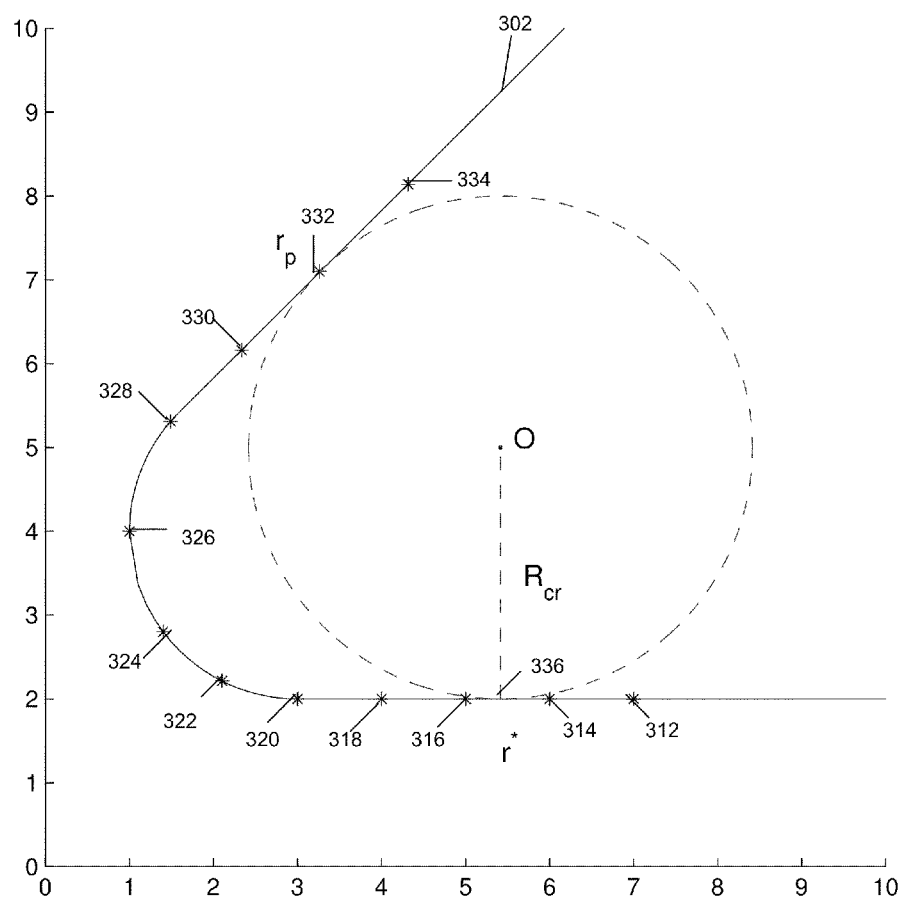
FIG. 6 illustrates the representation at a position for modifying the base path according to embodiments of the invention.

The repositioning of the disk continues until the disk only touches two points of the segment of the base path 302, or the disk touches curve 302 only at one point. Suppose that disk O was repositioned to the point $r_{j-q}$, where q is the qth step. However, this resulted in disk O failing to touch the segment of the base path 302 at another point other than $r_{j-q}$. This means that the last repositioning step was too large; i.e., when repositioning from point $r_{j-q+1}$, it is required to stop before the disk reaches point $r_{j-q}$, at some point r* lying on the line connecting $r_{j-q+1}$ and $r_{j-q}$, namely, when all, but one (denote it as $r_p$), points that were inside the disk leave it and the last point $r_p$ occurs on the disk boundary, as illustrated in FIG. 6.

To this end, the disk is returned to the position it occupied at the previous step (when it touched point $r_{j-q+1}$), and all data points lying inside the disk are identified. For every data point $r_i$ inside the disk, its distance $\Delta x_i$ to the disk boundary is calculated, and the angle $\gamma_i$ between the radius vector drawn from the center of the disk to the point $r_i$ and the repositioning direction (line connecting $r_{j-q+1}$ and $r_{j-q}$) is found. Let $X_i$ be the distance required to reposition disk O back along the straight line connecting $r_{j-q+1}$ and $r_{j-q}$ in order to have $r_i$ touch the boundary of disk O. Geometrically, it follows that:

$$X_i = R_{cr}\sqrt{1-\left(1-\frac{\Delta x_i}{R_{cr}}\right)^2 \sin^2\gamma_i} - (R_{cr} - \Delta x_i)\cos\gamma_i. \quad (10)$$

Then, the desired repositioning distance from $r_{j-q+1}$ that results in the desired situation shown in FIG. 5 is equal to the maximum of $X_i$ over all i. In other words, the distances $X_i$ for all points lying inside the disk are calculated and the maximum of $X_i$ over all i. is used to obtain the desired repositioning distance.

Figure 7:
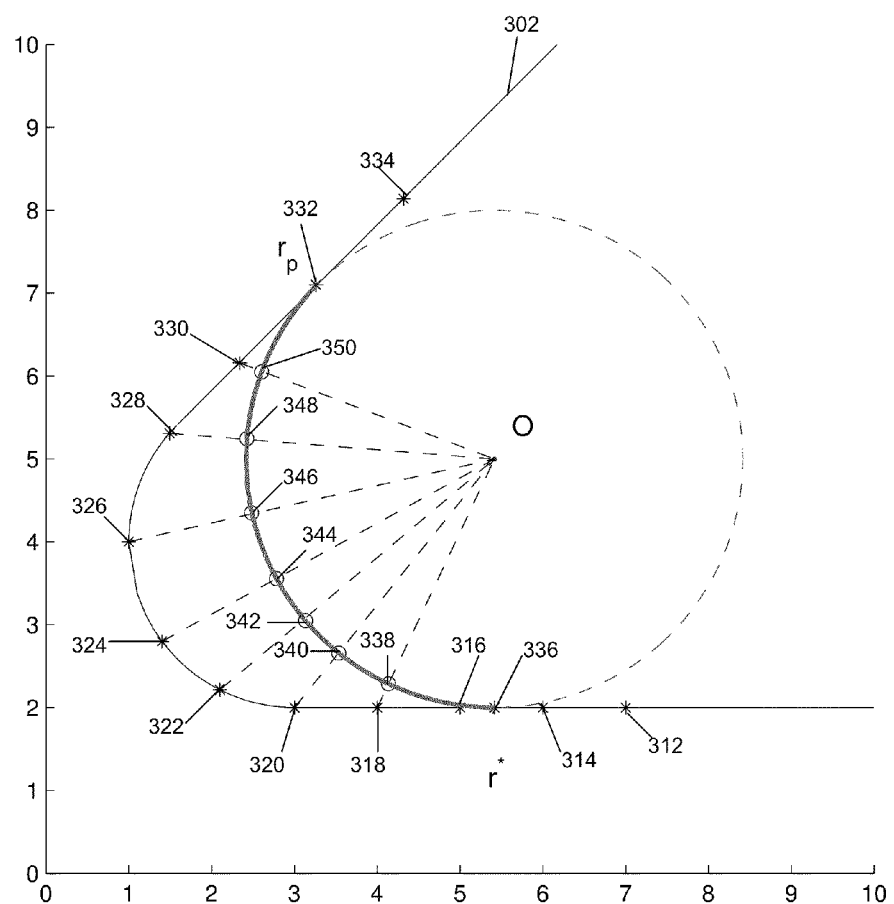
FIG. 7 illustrates modifying the base path to generate an offset path according to embodiments of the invention.

With reference to FIG. 7, the segment of the base path 302 between the points r* and $r_p$, 316, 318, 320, 322, 324, 326, 328, and 330, lie outside disk O. To modify the segment of the base path 302, the segment containing points 316, 318, 320, 322, 324, 326, 328, and 330 is replaced by the arc of disk O lying between these points. The arc, in this example, is the portion of the circumference defined between points 332 and 336. In this way, the curvature of the modified base path segment is equal to $k_{cr}$. In other words, the curvature of the modified base path satisfies the curvature constraint. More specifically, the data points $r_i$ belonging to the segment of the base path 302 between the points r* and $r_p$ are replaced by the new points $\hat{r}_i$ lying on the circle: each data point belonging to this segment is connected to the center of the disk by the straight line, and the intersection of this line with the circle arc is defined to be the new data point. In FIG. 7, this is illustrated by defining new data points 338, 340, 342, 344, 346, 348, and 350 to be used instead of the original data points 318, 320, 322, 324, 326, 328, and 330, respectively. By repeating this procedure for all segments of the base path that would not meet the curvature constraint, a new, nominal set of points $\hat{r}_1, \hat{r}_2, \ldots, \hat{r}_n$, is obtained. This nominal set of points consists of the modified data points belonging to the arcs of the disks replacing the segment of the base path that violate the curvature constraint and those original data points that were not subjected to modification.

The nominal data points $\hat{r}_1, \hat{r}_2, \ldots, \hat{r}_n$ represent the desired "minimal" modification of the base path, modified base path $\hat{r}(t)$. The modified base path is obtained by interpolating the nominal set of points with the help of the interpolation functions from the class that is used for interpolating the original data set. In one embodiment of this invention, the modified base path is approximated by a cubic B-spline curve. The modified base path generated according to embodiments of the invention satisfies the curvature constraint inequality (5) (or (6) if d<0). Hence, the segment of the offset path (3) for the modified segment $\hat{r}(t)$ given by the formula $$\tilde{r}(t) = \hat{r}(t) + d\hat{N}(t), \quad (11)$$

where $\hat{N}(t)$ is the normal to the modified segment $\hat{r}(t)$, meets the vehicle constraint inequality (1). Thus, the modified segment $\tilde{r}$ is the desired segment for the ground vehicle at a distance d from the corresponding segment of the base path.

The segment of the offset path to the modified base path defined by formula (II), can be generated differently. One way is to apply equation (11) to a discrete set of points belonging to the modified base path $\hat{r}(t)$ and interpolate the set obtained by using the same functions that were used for the original and nominal offset paths. Since the points of the nominal set are, generally, not equidistant, and the offset procedure also affects distances between the points along the curve, the discrete set of points representing the nominal offset path should include more points than n. To improve the accuracy of approximation of the offset path, the number of points may be increased by a factor of 3-10. In embodiments of this invention where the cubic B-spline interpolation is used, ten points are selected on each spline of the modified base path (the total number of splines, in this case, is n−3), and equation (11) is applied to these 10*(n−3) points. The resulting points lying on the offset path $\tilde{r}(t)$ are, first, approximated by a piecewise linear curve. Then, n equidistant points are selected on the curve. Finally, the desired segment of the offset path is constructed by approximating these n points by a cubic B-spline curve.

Embodiments of the invention are applicable to generating multiple offset paths from a base path, including the situation where distances between two adjacent offset paths are different. In some embodiments of this invention, all offset paths are generated from one base path. Since the nominal (modified) data set depends on the offset distance d and the distance from the base path is different for different segments of the offset paths, a modified data set is generated from the base path data set when a new segment of the offset path is generated. In particular, the radius of the disk being repositioned along the segment of the base path upon creation of a current modified data set is different for each segment of the offset path. In other embodiments of this invention, a generated offset path is considered to be the base path for the next offset path. If the offset distance is the same for all offset paths, the radius of the disk being rolled along the current base path is the same for all offset paths being generated. Segments of an offset path may also be at a distance of zero from the base path.

Figure 8:
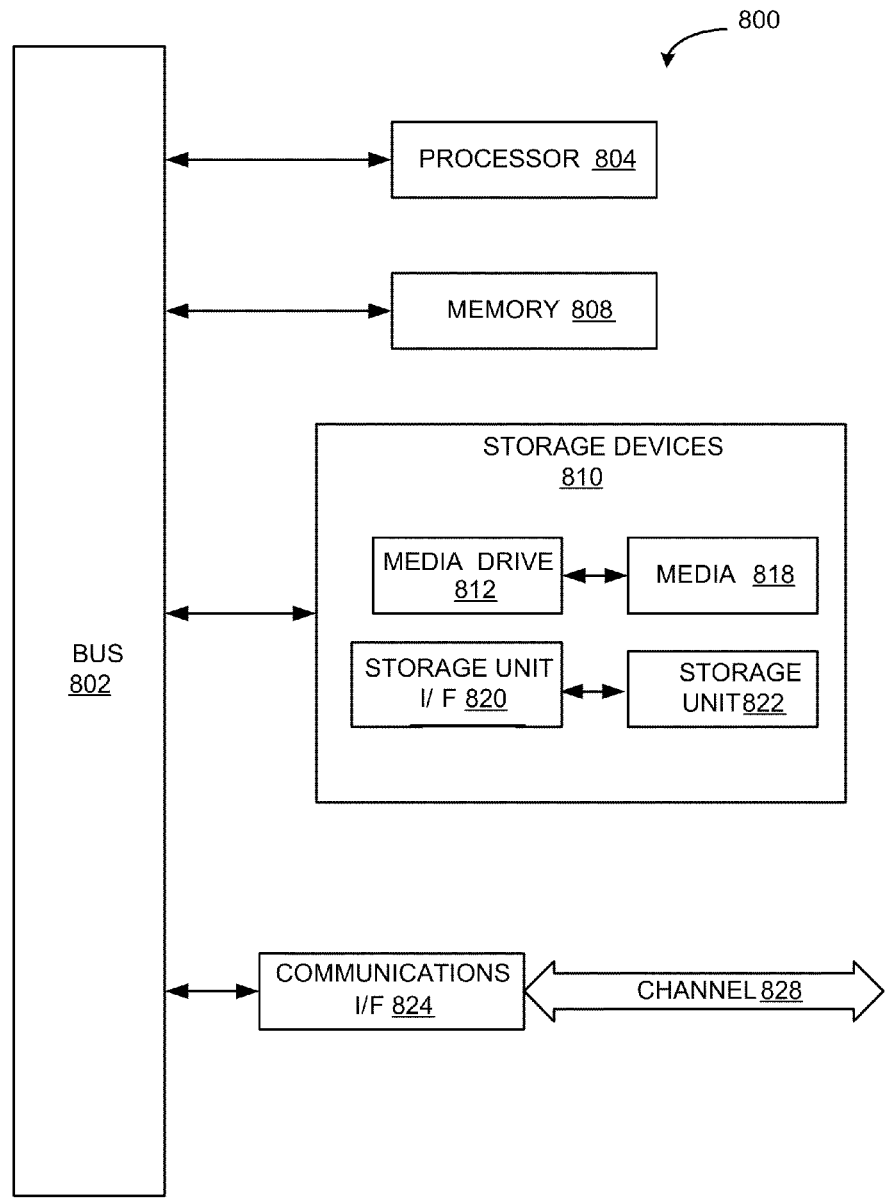
FIG. 8 illustrates a computing system to generate an offset path according to embodiments of the invention.

FIG. 8 illustrates a computing system according to embodiments of the invention. While aspects of the invention, including the above described systems and methods, are described in terms of particular embodiments and illustrative figures, those of ordinary skill in the art will recognize that the invention is not limited to the embodiments or figures described. Those skilled in the art will recognize that the operations of the various embodiments may be implemented using hardware, software, firmware, or combinations thereof, as appropriate. For example, some processes can be carried out using processors or other digital circuitry under the control of software, firmware, or hard-wired logic. (The term "logic" herein refers to fixed hardware, programmable logic, and/or an appropriate combination thereof, as would be recognized by one skilled in the art to carry out the recited functions.) Software and firmware can be stored on computer-readable media. Some other processes can be implemented using analog circuitry, as is well known to one of ordinary skill in the art. Additionally, memory or other storage, as well as communication components, may be employed in embodiments of the invention.

Computing system 800 may be employed to implement processing functionality for various aspects of the invention (e.g., as a server device, client device, database, presence platform, combinations thereof, and so on). Those skilled in the relevant art will also recognize how to implement the invention using other computer systems or architectures. Computing system 800 may represent, for example, a desktop, mainframe, server, client, or any other type of special or general purpose computing device as may be desirable or appropriate for a given application or environment. Computing system 800 can include one or more processors, such as a processor 804. Processor 804 can be implemented using a general or special purpose processing engine such as, for example, a microprocessor, microcontroller or other control logic. In this example, processor 804 is connected to a bus 802 or other communication medium.

Computing system 800 can also include a main memory 808, for example random access memory (RAM) or other dynamic memory, for storing information and instructions to be executed by processor 804. Main memory 808 also may be used for storing temporary variables or other nominal information during execution of instructions to be executed by processor 804. Computing system 800 may likewise include a read only memory ("ROM") or other static storage device coupled to bus 802 for storing static information and instructions for processor 804.

The computing system 800 may also include information storage mechanism 810, which may include, for example, a media drive 812 and a removable storage interface 820. The media drive 812 may include a drive or other mechanism to support fixed or removable storage media, such as a hard disk drive, a floppy disk drive, a magnetic tape drive, an optical disk drive, a CD or DVD drive (R or RW), or other removable or fixed media drive. Storage media 818 may include, for example, a hard disk, floppy disk, magnetic tape, optical disk, CD or DVD, or other fixed or removable medium that is read by and written to by media drive 814. As these examples illustrate, the storage media 818 may include a computer-readable storage medium having stored therein particular computer software or data.

In alternative embodiments, information storage mechanism 810 may include other similar instrumentalities for allowing computer programs or other instructions or data to be loaded into computing system 800. Such instrumentalities may include, for example, a removable storage unit 822 and an interface 820, such as a program cartridge and cartridge interface, a removable memory (for example, a flash memory or other removable memory module) and memory slot, and other removable storage units 822 and interfaces 820 that allow software and data to be transferred from the removable storage unit 818 to computing system 800.

Computing system 800 can also include a communications interface 824. Communications interface 824 can be used to allow software and data to be transferred between computing system 800 and external devices. Examples of communications interface 824 can include a modem, a network interface (such as an Ethernet or other NIC card), a communications port (such as for example, a USB port), a PCMCIA slot and card, etc. Some examples of a channel include a phone line, a cellular phone link, an RF link, a network interface, a local or wide area network, and other communications channels.

In this document, the terms "computer program product" and "computer-readable medium" may be used generally to refer to media such as, for example, memory 808, storage device 818, storage unit 822, or signal(s) on channel 828. These and other forms of computer-readable media may be involved in providing one or more sequences of one or more instructions to processor 804 for execution. Such instructions, generally referred to as "computer program code" (which may be grouped in the form of computer programs or other groupings), when executed, enable the computing system 800 to perform features or functions of embodiments of the present invention.

In an embodiment where the elements are implemented using software, the software may be stored in a computer-readable medium and loaded into computing system 800 using, for example, removable storage drive 814, drive 812 or communications interface 824. The control logic (in this example, software instructions or computer program code), when executed by the processor 804, causes the processor 804 to perform the functions of the invention as described herein.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Although the present invention has been described in connection with some embodiments, it is not intended to be limited to the specific form set forth herein. Rather, the scope of the present invention is limited only by the claims. Additionally, although a feature may appear to be described in connection with particular embodiments, one skilled in the art would recognize that various features of the described embodiments may be combined in accordance with the invention. Moreover, aspects of the invention describe in connection with an embodiment may stand alone as an invention.

Furthermore, although individually listed, a plurality of means, elements or method steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather the feature may be equally applicable to other claim categories, as appropriate.

Moreover, it will be appreciated that various modifications and alterations may be made by those skilled in the art without departing from the spirit and scope of the invention. The invention is not to be limited by the foregoing illustrative details, but is to be defined according to the claims.

What is claimed is:

1. A computer-implemented method for generating at least one segment of an offset path for a vehicle based on at least one segment of a base path, wherein the at least one segment of the base path is represented by a stored set of data points, the computer-implemented method comprising:
   determining a curvature of the at least one segment of the base path at each of the stored set of data points;
   comparing the determined curvature at each of the stored set of data points with a curvature constraint to identify a first subset of points from the stored set of data points that violate the curvature constraint and to identify a second subset of points from the stored set of data points that do not violate the curvature constraint, wherein the curvature constraint is based on a characteristic of the vehicle and a desired offset distance for at least one segment of an offset path from the at least one segment of the base path, and the characteristic reflects the vehicle's ability to traverse at least one segment of a path;
   modifying the first subset of points to satisfy the curvature constraint; and
   generating the at least one segment of the offset path for the vehicle to follow by offsetting the modified first subset of points and the second subset of points by a distance corresponding to the desired offset distance.

2. The computer-implemented method of claim 1, wherein the at least one segment of the offset path is parallel to a modified at least one segment of the base path represented by the modified first subset of points and the second subset of points.

3. The computer-implemented method of claim 2, wherein the at least one segment of the base path and the at least one segment of the offset path are interpolated by cubic B-splines.

4. The computer-implemented method of claim 1, wherein generating the at least one segment of the offset path includes interpolation by parametric functions.

5. The computer-implemented method of claim 1, wherein comparing the curvature constraint with the determined curvatures comprises comparing a representation of the curvature constraint with the curve of the at least one segment of the base path.

6. The computer-implemented method of claim 5, wherein the representation of the curvature constraint is graphically represented as a disk.

7. The computer-implemented method of claim 6, wherein a radius of the disk is based on a maximum wheel turning angle of the vehicle.

8. The computer-implemented method of claim 6, wherein comparing the disk with the determined curvatures further comprises:
   positioning the representation at a first violation point of the first subset of points;
   if any points of the base path are identified within the disk, then repositioning the disk along the path in the backward direction to the previous point of the at least one segment of the base path;
   identifying points of the stored set of data points of the at least one segment of the base path within the disk repositioned at the previous point; and
   continuing to reposition the disk along the path in the backward direction at other points, until no points of the at least one segment of the base path lie within the disk.

9. The computer-implemented method of claim 8, wherein the disk is repositioned until only two points of the set of data points of the at least one segment of the base path touch the disk, wherein the set of data points of the at least one segment of the base path between the two points comprises the first subset of points.

10. The computer-implemented method of claim 9, wherein modifying the first subset of points to satisfy the curvature constraint comprises:
replacing the first subset of points with the modified first subset of points on an arc of the disk defined by the two points of the disk that touch the at least one segment of the base path.

11. The computer-implemented method of claim 1, wherein the characteristic is based on a maximum wheel turning angle of the vehicle.

12. The computer-implemented method of claim 11, wherein the characteristic is also based on a wheel base of the vehicle.

13. A non-transitory computer-readable storage medium encoded with executable instructions for generating at least one segment of an offset path for a vehicle based on at least one segment of a base path, wherein the at least one segment of the base path is stored as a set of data points, the instructions comprising instructions for:
determining a curvature of the at least one segment of the base path at each of the stored set of data points;
comparing the determined curvature at each of the stored set of data points with a curvature constraint to identify a first subset of points from the stored set of data points that violate the curvature constraint and to identify a second subset of points from the stored set of data points that do not violate the curvature constraint, wherein the curvature constraint is based on a characteristic of the vehicle and a desired offset distance for at least one segment of an offset path from the at least one segment of the base path, and the characteristic reflects the vehicle's ability to traverse at least one segment of a path;
modifying the first subset of points-to satisfy the curvature constraint; and
generating the at least one segment of the offset path for the vehicle to follow by offsetting the modified first subset of points and the second subset of points by a distance corresponding to the desired offset distance.

14. The computer-readable storage medium of claim 13, wherein the at least one segment of the offset path is parallel to a modified at least one segment of the base path represented by the modified first subset of points and the second subset of points.

15. The computer-readable storage medium of claim 13, wherein the instructions for comparing the curvature constraint with the determined curvatures comprises instructions for comparing a representation of the curvature constraint with the curve of the at least one segment of the base path.

16. The computer-readable storage medium of claim 15, wherein the representation of the curvature constraint is graphically represented as a disk.

17. The computer-readable storage medium of claim 16, wherein a radius of the disk is based on a maximum wheel turning angle of the vehicle.

18. The computer-readable storage medium of claim 16, wherein the instructions for comparing the disk with the determined curvatures further comprises instructions for:
positioning the disk at a first violation point of the first subset of points;
if any points of the base path are identified within the disk, then repositioning the disk along the path in the backward direction to the previous point of the at least one segment of the base path;
identifying points of the stored set of data points of the at least one segment of the base path within the disk repositioned at the previous point; and
continuing to reposition the disk along the path in the backward direction at other points, until no points of the at least one segment of the base path lie within the disk.

19. The computer-readable storage medium of claim 18, wherein the disk is repositioned until only two points of the set of data points of the at least one segment of the base path touch the disk, wherein the set of data points of the at least one segment of the base path between the two points comprises the first subset of points.

20. The computer-implemented method of claim 19, wherein the instructions for modifying the first subset of points to satisfy the curvature constraint comprises instructions for:
replacing the first subset of points with the modified first subset of points on an arc of the disk defined by the two points of the disk that touch the at least one segment of the base path.

21. The computer-readable storage medium of claim 13, wherein the instructions for generating the at least one segment of the offset path includes instructions for interpolation by parametric functions.

22. The computer-readable storage medium of claim 13, wherein the at least one segment of the base path and the at least one segment of the offset path are interpolated by cubic B-splines.

23. The computer-readable storage medium of claim 13, wherein the characteristic is based on a maximum wheel turning angle of the vehicle.

24. The computer-readable storage medium of claim 23, wherein the characteristic is also based on a wheel base of the vehicle.

25. A system for generating an offset path for a vehicle based on a base path, wherein the at least one segment of the base path is stored as a set of data points, the system comprising:
a memory for storing instructions; and
a processor for executing the instructions, the instructions comprising instructions for:
determining a curvature of the at least one segment of the base path at each of the stored set of data points;
comparing the-determined curvature at each of the stored set of data points with a curvature constraint to identify a first subset of points from the stored set of data points that violate the curvature constraint and to identify a second subset of points from the stored set of data points that do not violate the curvature constraint, wherein the curvature constraint is based on a characteristic of the vehicle and a desired offset distance for at least one segment of an offset path from the at least one segment of the base path, and the characteristic reflects the vehicle's ability to traverse at least one segment of a path;
modifying the first subset of points to satisfy the curvature constraint; and
generating the at least one segment of the offset path for the vehicle to follow by offsetting the modified first subset of points and the second subset of points by a distance corresponding to the desired offset distance.

26. The system of claim 25, wherein the system is installed in the vehicle.

27. The system of claim 26, further comprising a GPS receiver for receiving GPS data for storing the at least one segment of the base path.

28. The system of claim 26, further comprising control logic connected to the processor for communicating with a steering control system of the vehicle.

29. The system of claim 25, further comprising a transmitter for transmitting the generated at least one segment of the offset path to the vehicle.

* * * * *